(12) United States Patent
Lee et al.

(10) Patent No.: US 10,317,609 B2
(45) Date of Patent: Jun. 11, 2019

(54) DISPLAY DEVICE

(71) Applicant: Samsung Display Co., Ltd., Yongin-Si, Gyeonggi-Do (KR)

(72) Inventors: Kang-woo Lee, Seoul (KR); Sunhee Oh, Anyang-si (KR); Yongkyu Kang, Hwaseong-si (KR); Hyunwoo Lee, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 108 days.

(21) Appl. No.: 15/346,900

(22) Filed: Nov. 9, 2016

(65) Prior Publication Data

US 2017/0139101 A1 May 18, 2017

(30) Foreign Application Priority Data

Nov. 12, 2015 (KR) .................. 10-2015-0159029
Apr. 7, 2016 (KR) .................. 10-2016-0042949

(51) Int. Cl.
*F21V 8/00* (2006.01)

(52) U.S. Cl.
CPC ........... *G02B 6/005* (2013.01); *G02B 6/0036* (2013.01); *G02B 6/0055* (2013.01); *G02B 6/0088* (2013.01); *G02B 6/0058* (2013.01)

(58) Field of Classification Search
CPC ..... G02B 6/005; G02B 6/0051; G02B 6/0053
See application file for complete search history.

(56) References Cited

U.S. PATENT DOCUMENTS

| | | | | |
|---|---|---|---|---|
| 5,396,350 A | * | 3/1995 | Beeson | F21V 5/02 349/62 |
| 5,839,823 A | * | 11/1998 | Hou | F21V 5/002 362/327 |
| 7,001,060 B1 | * | 2/2006 | Kimura | G02B 6/0053 349/63 |
| 9,970,604 B2 | * | 5/2018 | Yang | G02B 6/0021 |
| 10,113,089 B2 | * | 10/2018 | Edmonds | C09J 7/50 |
| 2007/0058391 A1 | * | 3/2007 | Wilson | G02B 6/0036 362/606 |
| 2007/0252923 A1 | * | 11/2007 | Hwang | G02B 6/0053 349/65 |
| 2007/0263139 A1 | * | 11/2007 | Hwang | G02B 6/0056 349/96 |

(Continued)

FOREIGN PATENT DOCUMENTS

JP 2000249836 9/2000
KR 1020080101814 A 11/2008

(Continued)

*Primary Examiner* — William N Harris
(74) *Attorney, Agent, or Firm* — Cantor Colburn LLP

(57) ABSTRACT

A display device includes a display panel, a light source and an optical component which receives light from the light source, outputs the provided light toward the display panel, and includes a light guiding film which guides the light toward the display panel, an optical sheet which is coupled to the light guiding film, and the optical sheet includes a base film and optical patterns disposed between the base film and the light guiding film to adjust the traveling direction of the light, and a reinforcing part filled between the base film and the light guiding film corresponding to a periphery of the optical component.

17 Claims, 13 Drawing Sheets

(56) References Cited

U.S. PATENT DOCUMENTS

| | | | | |
|---|---|---|---|---|
| 2012/0182767 A1* | 7/2012 | Petcavich | ............ | G02B 5/0221 |
| | | | | 362/627 |
| 2012/0268967 A1* | 10/2012 | Wang | ................... | G02B 6/0053 |
| | | | | 362/627 |
| 2013/0264590 A1* | 10/2013 | Oh | .......................... | H01L 33/48 |
| | | | | 257/88 |
| 2016/0363708 A1* | 12/2016 | You | ........................ | G02B 6/005 |
| 2018/0149795 A1* | 5/2018 | Lee | ...................... | G02B 6/0028 |

FOREIGN PATENT DOCUMENTS

| | | |
|---|---|---|
| KR | 100897504 B1 | 5/2009 |
| KR | 1020130015948 A | 2/2013 |
| KR | 1020150062799 A | 6/2015 |
| KR | 1020170039814 A | 4/2017 |

\* cited by examiner

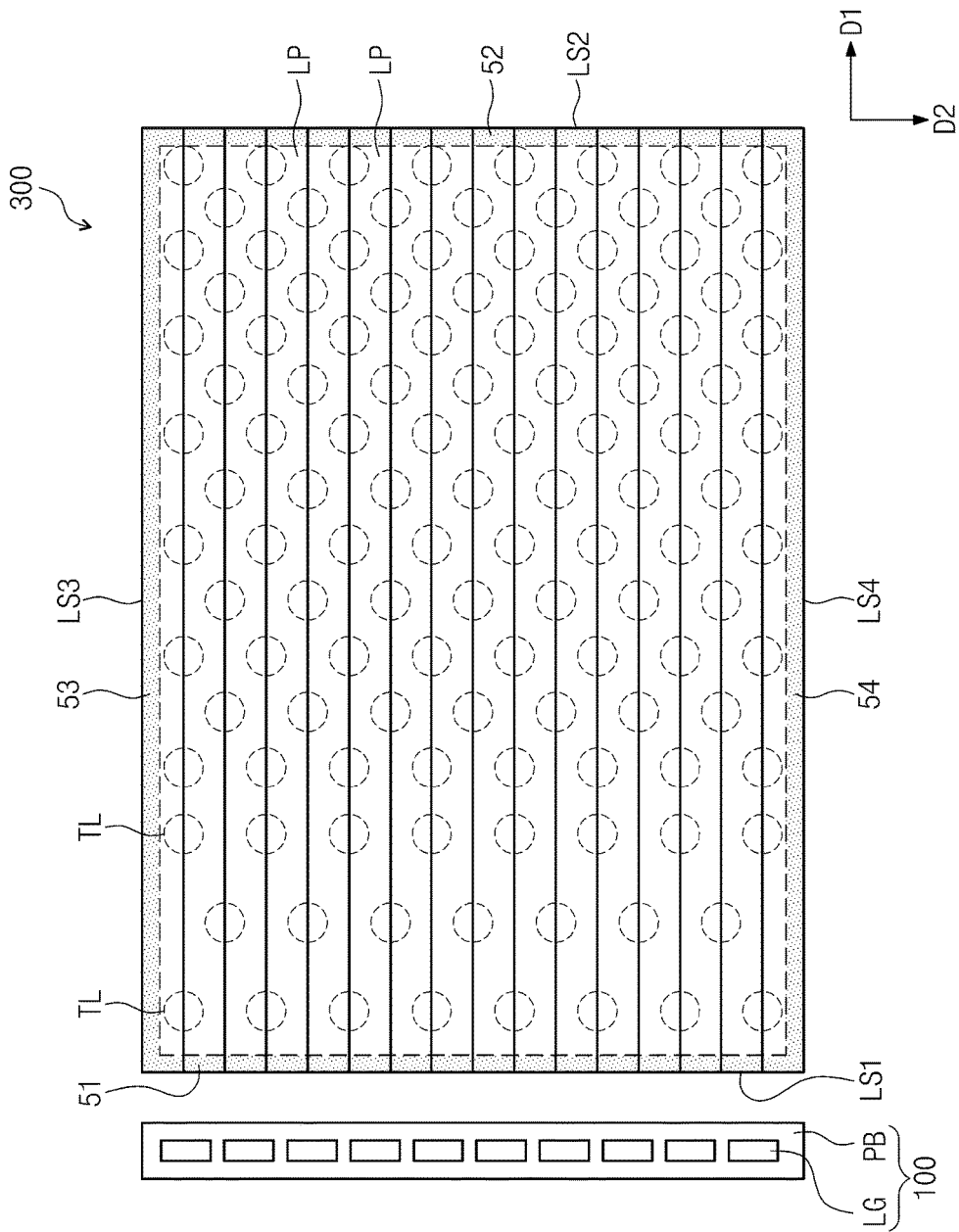

DISPLAY DEVICE

This application claims priority to Korean Patent Application No. 10-2015-0159029, filed on Nov. 12, 2015 and Korean Patent Application No. 10-2016-0042949, filed on Apr. 7, 2016, and all the benefits accruing therefrom under 35 U.S.C. § 119, the contents of which in their entireties are herein incorporated by reference.

BACKGROUND

1. Field

Exemplary embodiments of the invention herein relate to an optical component and a display device, and more particularly, to an optical component for controlling a traveling direction of light provided from a light source and a display device including the optical component.

2. Description of the Related Art

A display device, such as a liquid crystal display, includes a backlight assembly and a display panel for displaying images using a light outputted from the backlight assembly. The backlight assembly may include a light-emitting unit, a light guide plate and optical sheets controlling a path of a light emitted from the light guide plate.

The light guide plate guides the light generated from the light-emitting unit toward the display panel. A diffusing sheet and a prism sheet are examples of the optical sheets where the diffusing sheet diffuses the light emitted from the light guide plate, and the prism sheet collects the light emitted from the light guide plate toward a front surface direction of the display panel.

SUMMARY

The invention provides a display device including an optical component in which a light guiding film and on optical sheet are integrated, thereby having improved durability.

In an exemplary embodiment of the invention, a display device includes a display panel, a light source, and an optical component. The light source generates light, and the display panel receives the light to display an image. The optical component receives light from the light source and outputs the provided light toward the display panel. The optical component includes a light guiding film, an optical sheet, and a reinforcing part. The light guiding film guides the light toward the display panel, and the optical sheet is coupled to the light guiding film, and includes a base film, and optical patterns disposed between the base film and the light guiding film to adjust the traveling direction of the light. The reinforcing part is filled between the base film and the light guiding film corresponding to a periphery of the optical component.

In an exemplary embodiment of the invention, a display device may include a display panel, a light source, and an optical component which receives light from the light source and outputs the provided light toward the display panel.

In an exemplary embodiment, the optical component may include a light guiding film and an optical sheet coupled to the light guiding film.

In an exemplary embodiment, the optical sheet may include a base film, optical patterns and reinforcing patterns. The optical patterns may be disposed between the base film and the light guiding film. The reinforcing patterns may be disposed between the base film and the light guiding film, and each of the reinforcing patterns may include a reflective layer which is attached to the light guiding film.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 2 is a plan view illustrating rear surfaces of the light-emitting unit and the optical component illustrated in FIG. 1A;

DETAILED DESCRIPTION

Figure 1A:
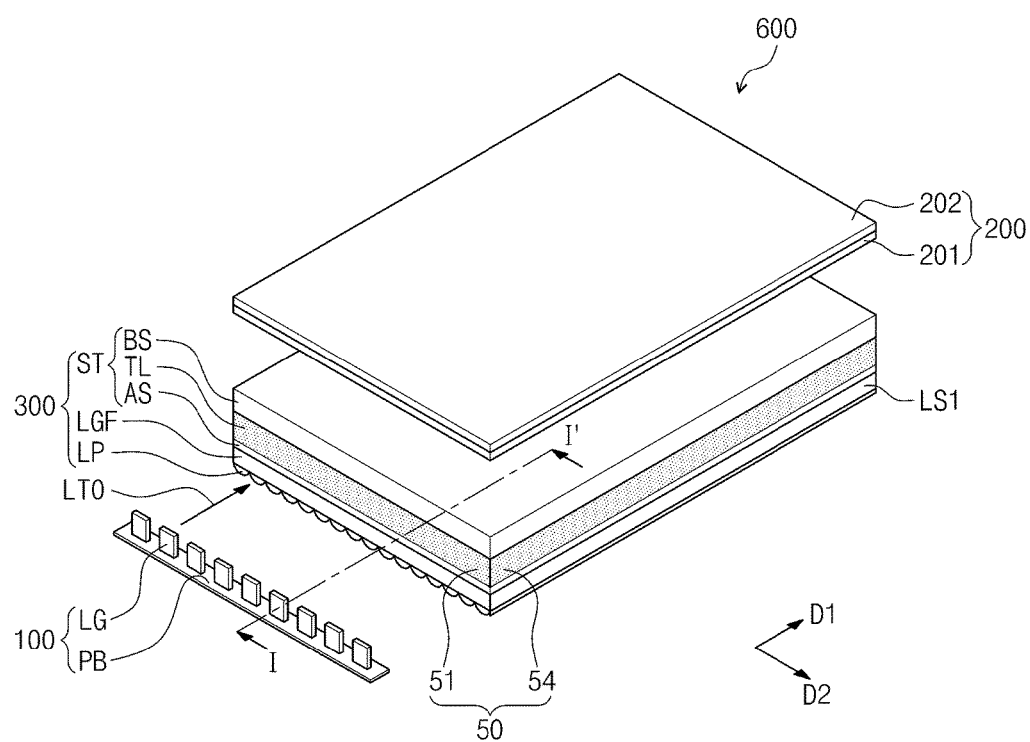
FIG. 1A is a perspective view of an exemplary embodiment of a display device according to the invention.

Hereinafter, exemplary embodiments of the present disclosure will be described in detail with reference to the accompanying drawings. The objects, features, and advantages of the invention will be understood without difficulties through embodiments below related to the accompanying drawings. The invention may, however, be embodied in many alternate forms and should not be construed as limited to only the embodiments set forth herein. Rather, these embodiments are provided so that this disclosure will be thorough and complete, and will fully convey the scope of the present disclosure to those skilled in the art. Accordingly, the scope of the present disclosure should not be construed as limited to the embodiments set forth herein. Meanwhile, like reference numerals in the following embodiments and drawings denote like elements.

Also, though the terms "first", "second", etc. are used herein for distinguishing one element from another element, these elements should not be limited by these terms. Also, it will be understood that when a film, a region, a component, etc. is referred to as being 'over' or "on" another layer, region, or plate, it can be directly on the other layer, region, or plate, or intervening layers, regions, or plates may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1B:
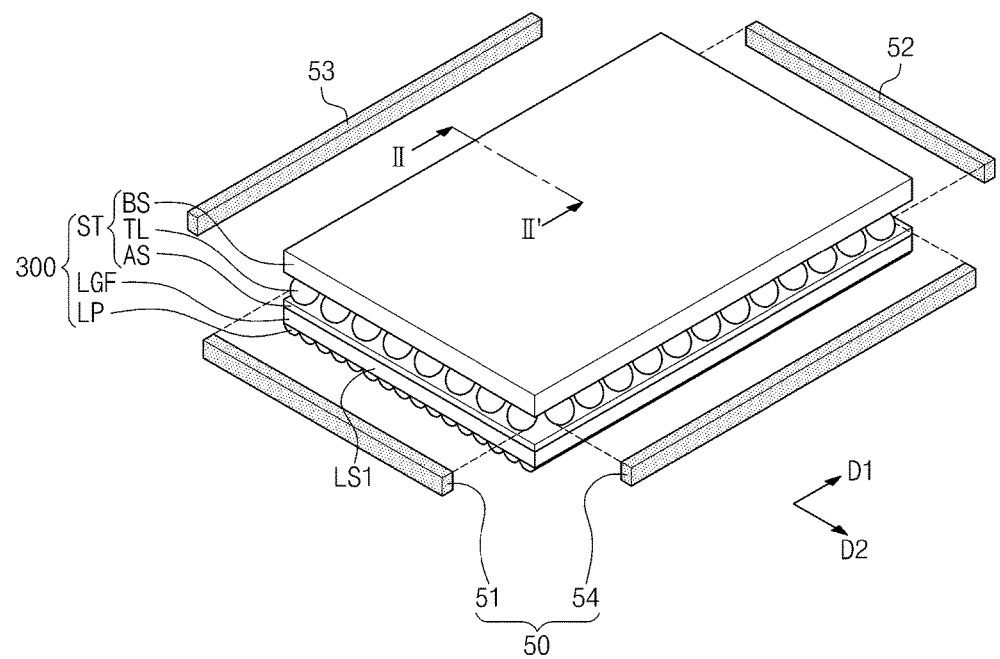
FIG. 1B is a perspective view of the optical component illustrated in FIG. 1A.

FIG. 1A is a perspective view of a display device according to an exemplary embodiment of the invention, and FIG. 1B is a perspective view of the optical component illustrated in FIG. 1A, and FIG. 2 is a plan view illustrating rear surfaces of the light-emitting unit and the optical component illustrated in FIG. 1A.

Referring to FIGS. 1A, 1B and 2, a display device 600 may be a liquid crystal display device, for example, and the display device 600 includes a display panel 200, a light-emitting unit 100, and an optical component 300.

The display panel 200 displays an image using light generated from the light-emitting unit 100. In the illustrated exemplary embodiment, the display panel 200 may include a first display substrate 201, a second display substrate 202, and a liquid crystal layer (not shown) interposed between the first display substrate 201 and the second display substrate 202.

In the illustrated exemplary embodiment, the first display substrate 201 may include a plurality of pixel electrodes (not shown) disposed corresponding one-to-one to a plurality of pixel regions, and the second display substrate 202 may include a common electrode (not shown) facing the plurality of pixel electrodes. However, the exemplary embodiment of the invention is not limited to the aforementioned structures of the first display substrate 201 and the second display substrate 202. In another exemplary embodiment, the second display substrate 202 may not include the common electrode, and the first display substrate 201 may instead include the common electrode, for example. In this case, the common electrode may be spaced apart from the plurality of pixel electrodes in the first display substrate 201.

The light-emitting unit 100 includes a drive circuit board PB and a plurality of light sources LG disposed (e.g., mounted) on the drive circuit board PB. In the illustrated embodiment, each of the plurality of light sources LG may be a light-emitting diode package, and the plurality of light sources LG receive power from the drive circuit board PB and thereby generate light LT0.

In the illustrated exemplary embodiment, the plurality of light sources LG may be arranged along one side of the optical component 300. In another exemplary embodiment, other plurality of light sources may further be arranged along the other side of the optical component 300.

In the illustrated exemplary embodiment, the optical component 300 includes a light guiding film LGF, light-collecting layers LP, an optical sheet ST, and a reinforcing part 50. The optical component 300 receives the light LT0 from the plurality of light sources LG, and outputs the received light LT0 toward the display panel 200.

In the illustrated embodiment, the light guiding film LGF may include a polymer material, and the light guiding film LGF may have a shape of a thin film and thus have flexibility. In an exemplary embodiment, the light guiding film LGF may include polyethylene terephthalate ("PET"), polymethyl methacrylate ("PMMA"), or polycarbonate ("PC"), for example, and the thickness of the light guiding film LGF taken along a normal direction perpendicular to the first and second directions D1 and D2 may be about 100 micrometers to about 500 micrometers, for example.

Figure 4:
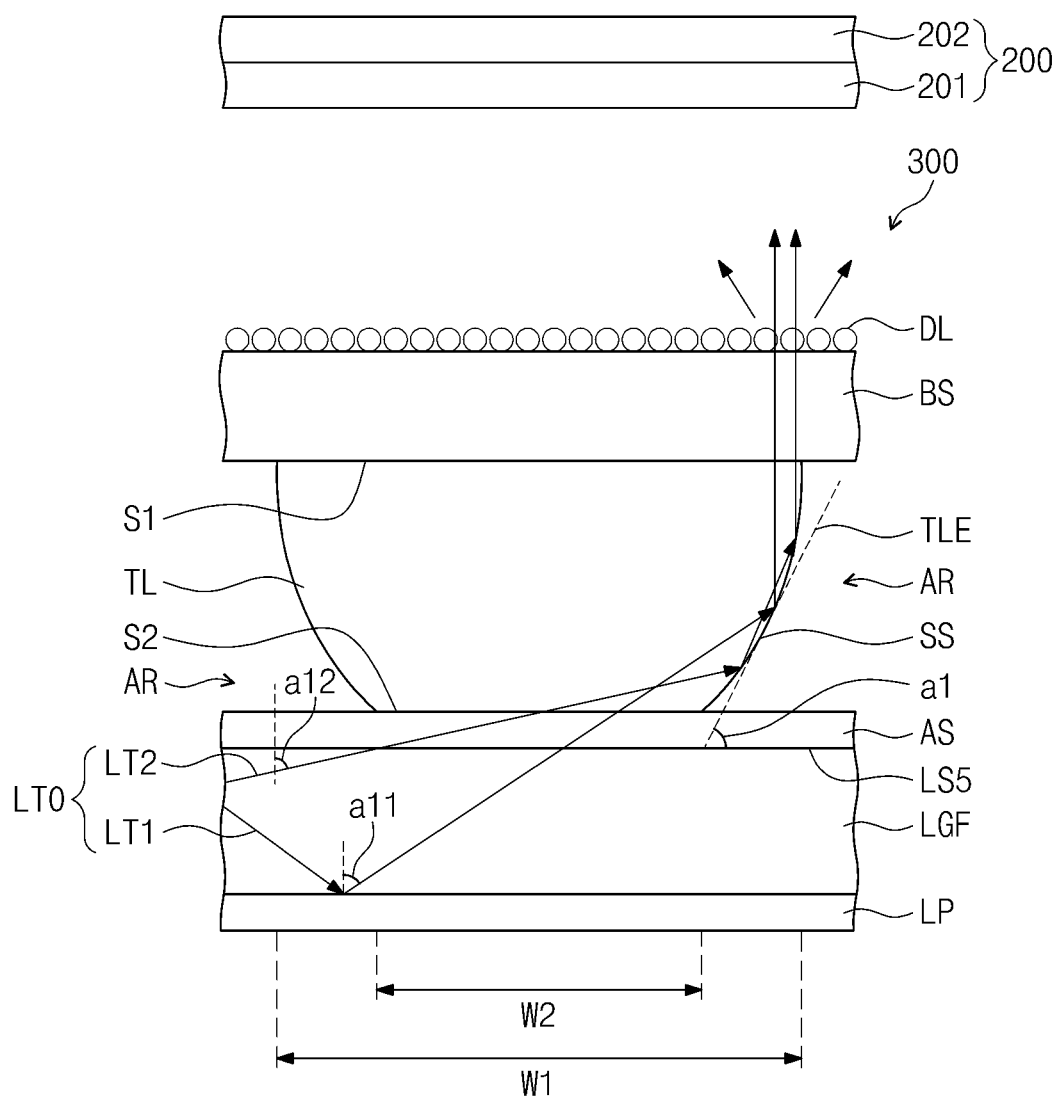
FIG. 4 is a view for describing the optical function of any one of the optical patterns illustrated in FIG. 3A.

In the light guiding film LGF, an incident surface LS1, an opposing surface LS2 opposing the incident surface LS1, a first connecting surface LS3, a second connecting surface LS4, and an emitting surface LS5 (refer to FIG. 4). The light LT0 is incident into the light guiding film LGF through the incident surface LS1, and the incident light LT0 is emitted to the outside of the light guiding film LGF through the emitting surface. The first connecting surface LS3 connects the incident surface LS1 to the opposing surface LS2, and the second connecting surface LS4 faces the first connecting surface LS3 and connects the incident surface LS1 to the opposing surface LS2.

When the thickness of the light guiding film LGF is smaller than the width of the light-emitting surface of each of the light sources LG taken along the second direction D2, the width of the incident surface LS1 may be designed larger than the width of the opposing surface LS2, or an optical member connecting the incident surface LS1 of the light guiding film LGF with the light sources LG may be disposed. Accordingly, an efficiency in which the light LT0 is incident into the light guiding film LGF side may be improved.

The light-collecting layers LP are disposed on a rear surface of the light guiding film LGF. In the illustrated exemplary embodiment, each of the light-collecting layers LP has a shape protruding from the rear surface of the light guiding film LGF, and refracts or reflects the light traveling inside the light guiding film LGF in a direction towards a front surface of the display panel 200.

In the illustrated exemplary embodiment, each of the light-collecting layers LP may have a prism shape or a lenticular shape, for example. Also, when a first direction D1 from the incident surface LS1 toward the opposing surface LS2 and a second direction D2 perpendicular to the first direction D1 are defined, each of the light-collecting layers LP may extend in the first direction D1 in the illustrated exemplary embodiment. Accordingly, each of the light-collecting layers LP has a length direction in the first direction D1, and has a width direction in the second direction D2.

In the illustrated exemplary embodiment, the display device 600 may further include a reflective sheet (not shown) facing the display panel 200 with the optical component 300 disposed therebetween. In another exemplary embodiment, instead of the reflective sheet, the rear surface of the light guiding film LGF may be coated with a reflective material, and thus the light LT0 may be prevented from leaking through the rear surface of the light guiding film LGF.

The optical sheet ST may be coupled to the light guiding film LGF, and may thereby have a shape integrated with the light guiding film LGF. In the illustrated exemplary embodiment, the optical sheet ST includes a base film BS, optical patterns TL, and an adhesive layer AS (refer to FIG. 3A).

The base film BS may have a light-transmitting property together with flexibility. In an exemplary embodiment, the base film BS includes a polymer material such as PET, PMMA, or PC, has a thickness of about several tens of micrometers to about several hundreds of micrometers, and may thereby have a shape of a thin film.

In an exemplary embodiment, the optical patterns TL may include a polymer material having a light-transmitting property such as PET, polyethylene naphthalate ("PEN"), PC, or PMMA. The optical patterns TL are disposed on the base film BS to contact the adhesive layer AS on the light guiding film LGF, and as a result, the light LT0 totally reflected inside the light guiding film LGF may be emitted to the outside of the light guiding film LGF through the optical patterns TL. Also, the light LT0 is refracted by the optical patterns TL and is collected in a direction toward the front surface of the display panel 200.

In the illustrated exemplary embodiment, the optical patterns TL may be disposed to be spaced apart from each other, and each of the optical patterns TL may have a dot shape in a plan view. In FIG. 2, although each of the optical patterns TL is illustrated in a circular shape, each of the optical patterns TL may have a dot shape other than the circular shape. In an exemplary embodiment, each of the optical patterns TL may have a dot shape of an ellipse or a polygon, for example.

As described above, since the optical patterns TL emits the light totally reflected inside the light guiding film LGF to the outside, the amount of the light LT0 emitted from the light guiding film LGF through the optical patterns TL may be increased as the density of the optical patterns TL is increased in the light guiding film LGF. Accordingly, as illustrated in FIG. 2, the closer the optical patterns TL to the incident surface LS1, the smaller the density of the optical patterns TL may become, and the closer the optical patterns TL to the opposing surface LS2, the greater the density of the optical patterns TL may become.

The reinforcing part 50 is filled, corresponding to the periphery of the optical component 300, between the base film BS and the light guiding film LGF. In the illustrated exemplary embodiment, the reinforcing part 50 includes a first reinforcing pattern 51, a second reinforcing pattern 52, a third reinforcing pattern 53, and a fourth reinforcing pattern 54. The first reinforcing pattern 51 has a linear shape extending along the incident surface LS1, the second reinforcing pattern 52 has a linear shape extending along the opposing surface LS2, the third reinforcing pattern 53 has a linear shape extending along the first connecting surface LS3, and the fourth reinforcing pattern 54 has a linear shape extending along the second connecting surface LS4.

In the illustrated exemplary embodiment, two reinforcing patterns adjacent to each other among the first to fourth reinforcing patterns 51 to 54 have shapes connected to each other, so that the first to fourth reinforcing patterns 51 to 54 may have an integrated shape.

In the illustrated exemplary embodiment, a lower end portion of the reinforcing part 50 may be adhered to the adhesive layer AS, and an upper end portion of the reinforcing part 50 may contact the base film BS. That is, the reinforcing part 50 may function as a supporting spacer between the light guiding film LGF and the base film BS, and thus a coupling force between the optical sheet ST and the light guiding film LGF is improved by the reinforcing part 50. Thus, the optical sheet ST may be prevented from being delaminated from the light guiding film LGF.

In the illustrated exemplary embodiment, the reinforcing part 50 may include the same material as that of the optical patterns TL. In terms of a manufacturing method for the reinforcing part 50, when the optical patterns TL are manufactured on the base film BS by an imprinting method, for example, the reinforcing part 50 may be provided by being imprinted together with the optical patterns TL.

In another exemplary embodiment, the reinforcing part 50 may include a material different from that of the optical patterns TL. More specifically, the reinforcing part 50 may include a polymer material colored with a black pigment or dye, for example. Accordingly, the optical patterns TL may block the light introduced into the optical component 300.

Figure 3A:
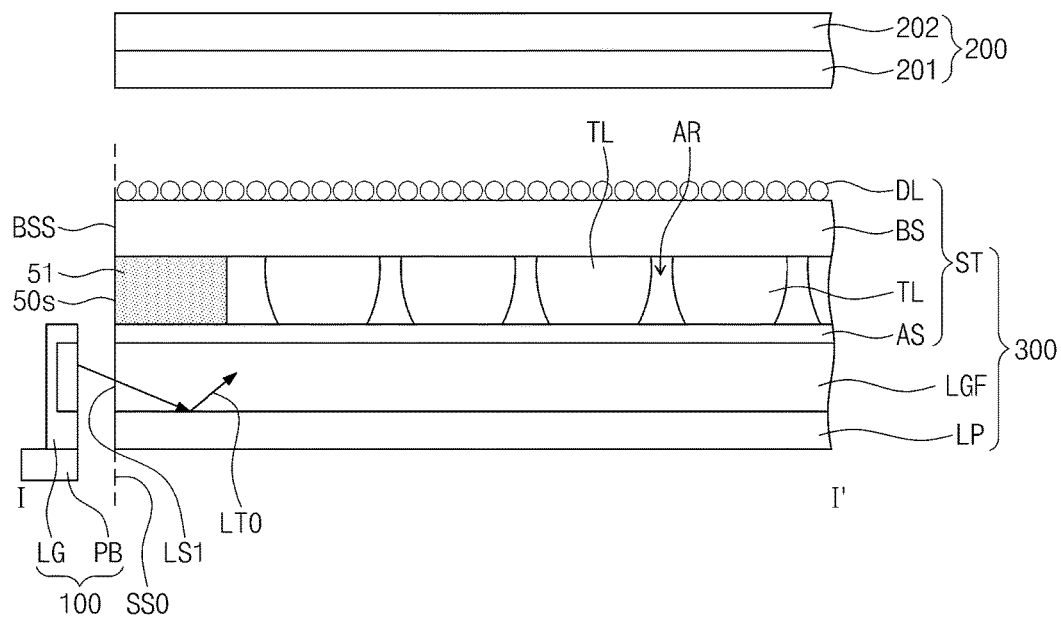
FIG. 3A is a cross-sectional view illustrating a cross-sectional surface taken along line I-I' of FIG. 1A.
Figure 3B:
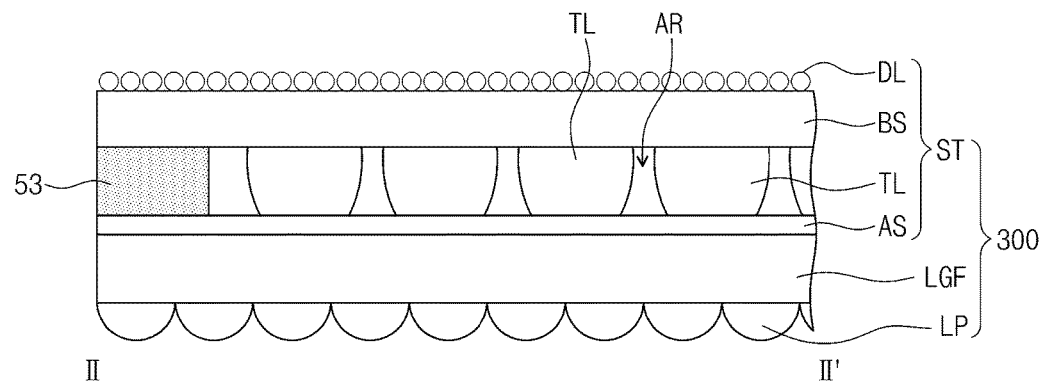
FIG. 3B is a cross-sectional view illustrating a cross-sectional surface taken along line II-IF of FIG. 1B.

FIG. 3A is a cross-sectional view illustrating a cross-sectional surface taken along line I-I' of FIG. 1A, and FIG. 3B is a cross-sectional view illustrating a cross-sectional surface taken along line II-IF of FIG. 1B.

Referring to FIGS. 3A and 3B, the optical sheet ST is disposed on the light guiding film LGF and has a shape integrated with the light guiding film LGF. The collecting layers LP are disposed on the rear surface of the light guiding film LGF, and the adhesive layer AS is disposed on the upper surface of the light guiding film LGF. In the illustrated exemplary embodiment, the adhesive layer AS may include an adhesive material having a light-transmitting property, and the adhesive layer AS may be, for example, an optical clear adhesive.

The optical patterns TL and the first reinforcing pattern 51 are disposed on the adhesive layer AS to be adhered to the adhesive layer AS, the base film BS is laminated on the optical patterns TL and the first reinforcing pattern 51, and a diffusing layer DL is disposed on the base film BS.

The optical patterns TL are arranged to be spaced apart from each other between the light guiding film LGF and the base film BS, and an air layer AR is interposed between two optical patterns adjacent to each other among the optical patterns TL. In the illustrated exemplary embodiment, the optical patterns TL may include a polymer material such as PET, PMMA, or PC, and thus the refractive index of the optical patterns TL is greater than that of the air layer AR. Accordingly, a total reflection may be generated at an interface between the optical patterns TL and the air layer AR according to the angle of light incident into the interface after being emitted from the light guiding film LGF.

Referring further to FIG. 1, a method of manufacturing the optical component 300 having the structure described above is described in detail as follows. A reinforcing part 50 which includes optical patterns TL and a first reinforcing pattern 51 is disposed on one surface of a base film BS, and a diffusing layer DL is disposed on the other surface of the base film BS, thereby completing the manufacture of an optical sheet ST. Also, light-collecting layers LP are disposed on one surface of the light guiding film LGF, and an adhesive layer AS is provided on the other surface of the light guiding film LGF. Subsequently, the optical sheet ST is pressed toward the adhesive layer AS, and the optical patterns TL and the reinforcing part 50 are thereby adhered to the adhesive layer AS. As a result, the manufacture of the optical component 300 in which the optical sheet ST and the light guiding film LGF are integrated may be completed.

Also, a method of manufacturing the optical component 300 in plurality is as follows. A plurality of optical patterns including the optical patterns TL, a plurality of reinforcing parts including the reinforcing part 50, and a plurality of diffusing layers including the diffusing layer DL are disposed on a preliminary base film which has a size of several times to several hundred times of the base film BS, thereby completing the manufacture of a preliminary optical sheet. Also, a plurality of light-collecting layers including the light-collecting layer LP, and a plurality of adhesive layers including the adhesive layer AS are disposed on a preliminary light guiding film which has a size of several times to several hundred times that of the light guiding film LGF, thereby completing the manufacture of a preliminary light guiding film LGF. Subsequently, preliminary optical components are provided by attaching the preliminary optical sheet to the preliminary light guiding film using the plurality of adhesive layers; and then the preliminary optical components are cut multiple times in a size of the optical component 300, thereby forming the optical component 300 in plurality.

Unlike the exemplary embodiments of the invention, when the optical component 300 does not include the reinforcing part 50, a delamination phenomenon in which the light guiding film LGF is delaminated from the optical sheet ST by the pressure applied to the position at which the preliminary optical components are cut may occur. Especially, when the position at which the preliminary optical components are cut overlaps that of the air layer AR, the delamination phenomenon may occur because there is no supporting means between the light guiding film LGF and the optical sheet ST corresponding to the pressure applied to the preliminary optical components. However, in the exemplary embodiment of the invention, since the reinforcing part 50 is disposed to overlap the position at which the preliminary optical components are cut, and the light guiding film LGF and the optical sheet ST are supported by the reinforcing part 50 therebetween, the delamination phenomenon may be prevented from occurring.

The diffusing layer DL is disposed on the base film BS, and faces the optical patterns TL with the base film BS disposed therebetween. The diffusing layer DL diffuses the light which sequentially has passed through the optical patterns TL and the base film BS. Accordingly, after light is collected in a direction toward the front surface of the display panel 200 by the optical patterns TL, the light may be diffused in the front surface direction by the diffusing layer DL.

As described above in detail, when the preliminary optical sheet and the preliminary light guiding film are simultaneously cut to thereby manufacture the optical component 300, an outer surface BSS of the base film, an outer surface 50S of the reinforcing part, and the incident surface LS1 which is an outer surface of the light guiding film may be positioned on one imaginary plane SS0 at one side of the optical component 300. Accordingly, this may mean that the imaginary surface SS0 is a cut surface at which the preliminary optical sheets and the preliminary light guiding film are simultaneously cut.

In the illustrated exemplary embodiment, the diffusing layer DL may include a binder and diffusing particles distributed inside the binder. In an exemplary embodiment, the diffusing particles may include a semi-transmitting material such as a titanium oxide ($TiO_2$) or an aluminum oxide ($Al_2O_3$).

Hereinafter, referring further to FIG. 4, the structure and the function of the optical patterns TL will be described as follows.

FIG. 4 is a view for describing the optical function of any one of the optical patterns illustrated in FIG. 3A. Since the optical patterns TL have structures and optical functions similar to one another, the structure and the optical function of one of the optical patterns TL are described in describing FIG. 4, and the description of the remaining optical patterns will not be provided.

Referring to FIGS. 3A and 4, the optical pattern TL has an upper surface S1, a lower surface S2, and a side surface SS connecting the upper surface S1 to the lower surface S2. The upper surface S1 contacts the base film BS with a first width W1, and the lower surface S2 contacts the adhesive layer AS with a second width W2.

In the illustrated exemplary embodiment, the optical pattern TL has a tapered shape, the closer the optical pattern TL to the upper surface S1, the greater the width of the optical pattern TL, and the closer the optical pattern TL to the lower surface S2, the smaller the width of the optical pattern TL. Accordingly, the first width W1 may be a maximum width of the optical pattern TL, and the second width W2 may be a minimum width of the optical pattern TL.

The side surface SS of the optical pattern TL contacts the air layer AR. Accordingly, due to the difference in refractive indexes of the optical pattern TL and the air layer AR at the side surface, the light may be reflected at the side surface SS.

In the illustrated exemplary embodiment, the side surface SS may have a round shape, for example. More specifically, the side surface SS may have a round shape convex toward the air layer AR. Also, in the illustrated exemplary embodiment, when a tangential line TLE of the side surface SS is defined, an acute angle a1 between the tangential line TLE and the emitting surface LS3 may be about 30 degrees to about 70 degrees, for example. However, the exemplary embodiment of the invention is not limited to the magnitude of the acute angle a1, but the magnitude of the acute angle a1 may vary according to the size of the light guiding film LGF or the distance between the optical pattern TL and the light source LG (refer to FIG. 2).

Optical functions of the optical pattern TL having the above-described structure will be described as follows. The light LT0 totally reflected inside the light guiding film LGF is divided into a first light LT1 and a second light LT2. The first light LT1 is totally reflected inside the light guiding film LGF, then passes through the adhesive layer AS, and is then incident to the optical pattern TL with a first incident angle a11.

Since each of the light guiding film LGF, the adhesive layer AS, and the optical pattern TL has a polymer material to thereby have refractive indexes similar to one another, the total reflection of the first light LT1 may be minimized at the interface between the light guiding film LGF and the adhesive layer AS and at the interface between the adhesive layer AS and the optical pattern TL. Accordingly, most of the first light LT1 may be incident to the optical pattern TL through the adhesive layer AS.

After the first light LT1 is incident to the optical pattern TL, the first light LT1 is reflected at the side surface SS of the optical pattern TL. As described above in detail, since the side surface SS contacts the air layer AR, and the air layer AR has the refractive index smaller than that of the optical pattern TL, the reflection of the first light LT1 at the side surface SS may be induced.

The side surface SS has a shape convex toward the air layer AR. Accordingly, when viewed in a side surface, the first light LT1 which reaches the side surface SS in a direction inclined with respect to the normal line of the light guiding film LGF is reflected at the side surface SS, the traveling direction of the first light LT1 may be changed approximately to the front surface direction of the display panel 200. Subsequently, the first light LT1 is diffused as passing through the diffusing layer TL, and as a result, the first light LT1 may be finally emitted from the optical component 300.

The second light LT2, after being totally reflected inside the light guiding film, passes through the adhesive layer AS, and is then incident into the optical pattern TL with a second incident angle a12, the second incident angle a12 being greater than the first incident angle a11. In this case, unlike the first light LT1, the second light LT2 incident to the optical pattern TL may be reflected multiple times at the side surface SS. The greater the number of times that the second light LT2 is reflected at the side surface SS is, the more adjacent the traveling direction of the second light LT2 to the front surface direction of the display panel is.

Figure 5A:
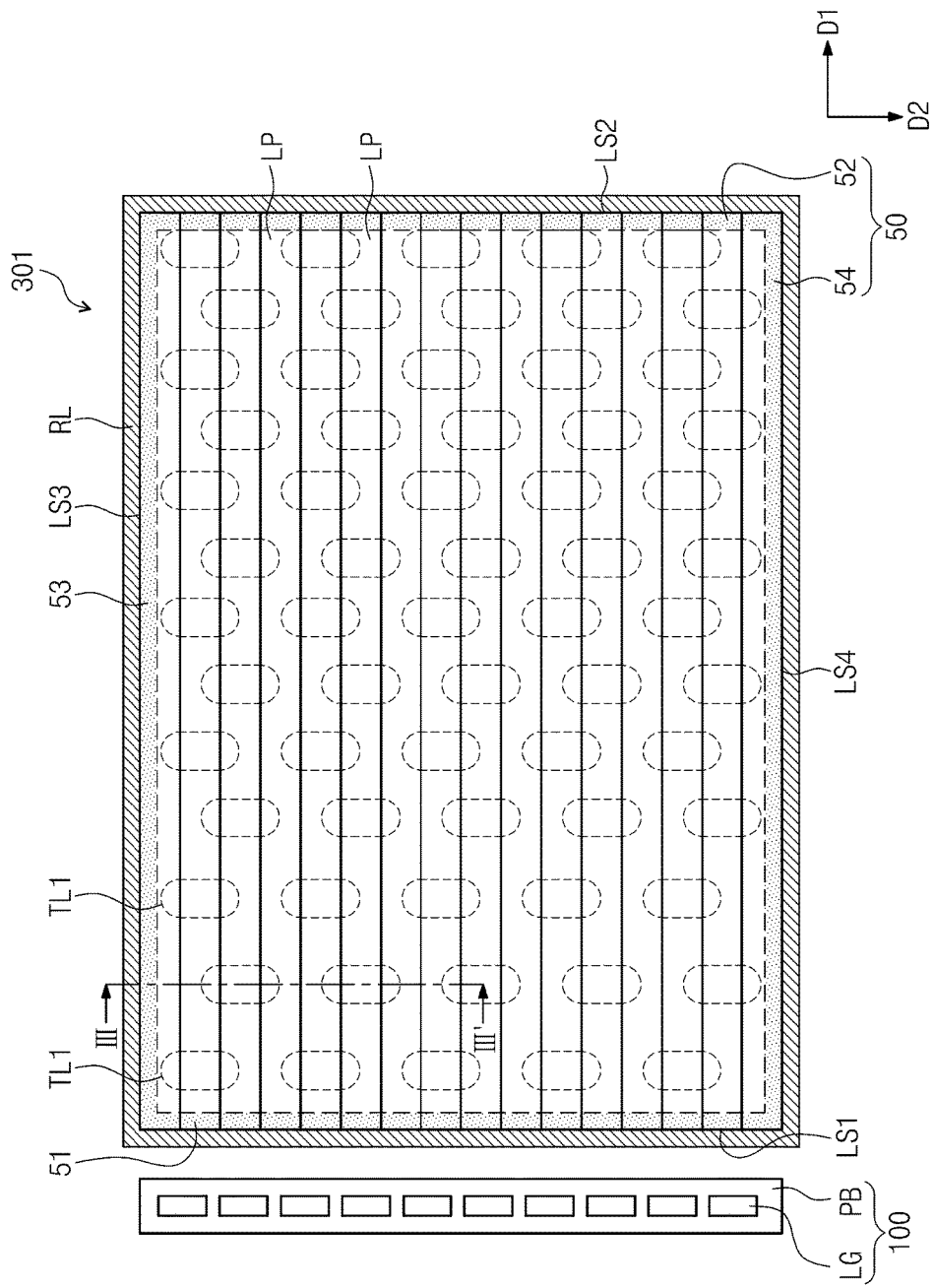
FIG. 5A is a plan view illustrating another exemplary embodiment of an optical component and a light-emitting unit according to the invention.
Figure 5B:
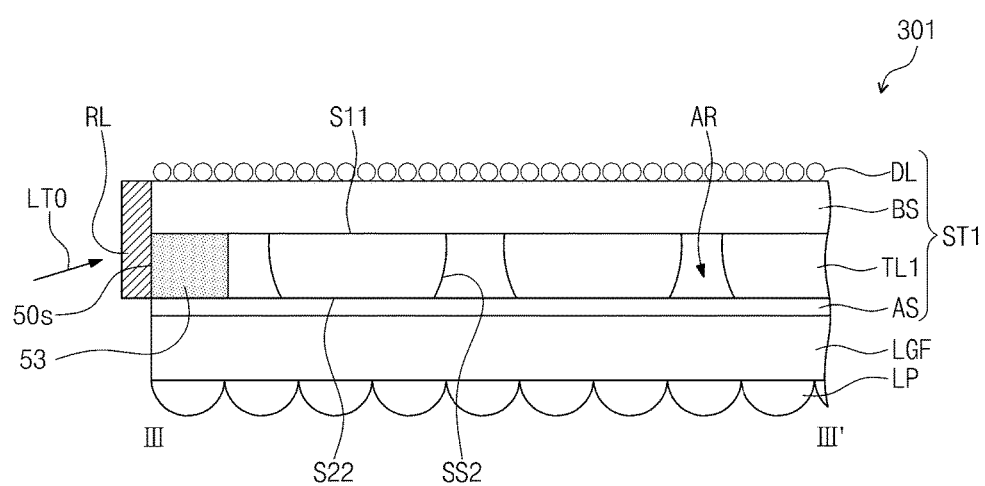
FIG. 5B is a cross-sectional view illustrating a portion taken along line of FIG. 5A.

FIG. 5A is a plan view of an optical component and a light-emitting unit according to another exemplary embodiment of the invention, and FIG. 5B is a cross-sectional view illustrating a portion taken along line of FIG. 5A. In describing FIGS. 5A and 5B, previously described components will be designated by the same reference numerals, and overlapping descriptions thereof will not be provided.

Referring to FIGS. 5A and 5B, an optical component 301 includes a light guiding film LGF, light-collecting layers LP, and optical sheet ST1, and the optical sheet ST1 includes a base film BS, optical patterns TL1, and an adhesive layer AS. Since the optical patterns TL have structures similar to one another, the structure of one of the optical patterns TL1 is exemplarily described, and the description of the remaining optical patterns will not be provided.

In the illustrated exemplary embodiment, in a plan view, the optical pattern TL1 has an upper surface S11, a lower surface S22, and a side surface SS2 connecting the upper surface S11 to the lower surface S22. In the illustrated exemplary embodiment, the length direction of each of the upper surface S11 and the lower surface S22 is parallel to a second direction D2, and the width direction of each of the upper surface S11 and the lower surface S22 is parallel to a first direction D1. That is, in the exemplary embodiment illustrated above in FIG. 2, the optical pattern TL (refer to FIG. 2) has a dot shape in a plan view. However, in the exemplary embodiment illustrated in FIGS. 5A and 5B, the optical pattern TL1 has an elongated shape and thus the length direction and the width direction may be defined for each of the upper surface S11 and the lower surface S11.

In the illustrated exemplary embodiment, the optical component 301 further includes a light-blocking layer RL. The light-blocking layer RL is disposed on an outer surface 50S of a reinforcing part 50, and blocks light LT0. Like the illustrated exemplary embodiment, when the reinforcing part 50 includes first to fourth reinforcing patterns 51, 52, 53, and 54, the light-blocking layer RL is disposed on an outer surface of each of the first to fourth reinforcing patterns 51, 52, 53, and 54.

The light-blocking layer RL is positioned at the outermost side of the optical component 301. Accordingly, when the light-blocking layer RL is not provided to the optical component 301, the outer surface 50S of the reinforcing part is exposed to the outside. However, when the optical component 301 includes the light-blocking layer RL, the outer surface 50S of the reinforcing part 50 is covered by the light-blocking layer RL.

In the illustrated exemplary embodiment, the light-blocking layer RL may include a metallic material such as silver (Ag) or aluminum (Al). Accordingly, when the light LT0 is provided to the light-blocking layer RL, the light-blocking layer RL reflects the light LT0 to thereby prevent the light LT0 from being introduced into the optical component 301.

In another exemplary embodiment, the light-blocking layer RL may include a polymer material including a titanium oxide or a white pigment, for example, and reflects the light LT0, so that the light LT0 may be prevented from being introduced into the optical component 301.

In still another exemplary embodiment, the light-blocking layer RL may include a polymer material including carbon or a black pigment. Accordingly, the light-blocking layer RL absorbs the light LT0, and the light LT0 may thereby be prevented from being introduced into the optical component 301.

Figure 6:
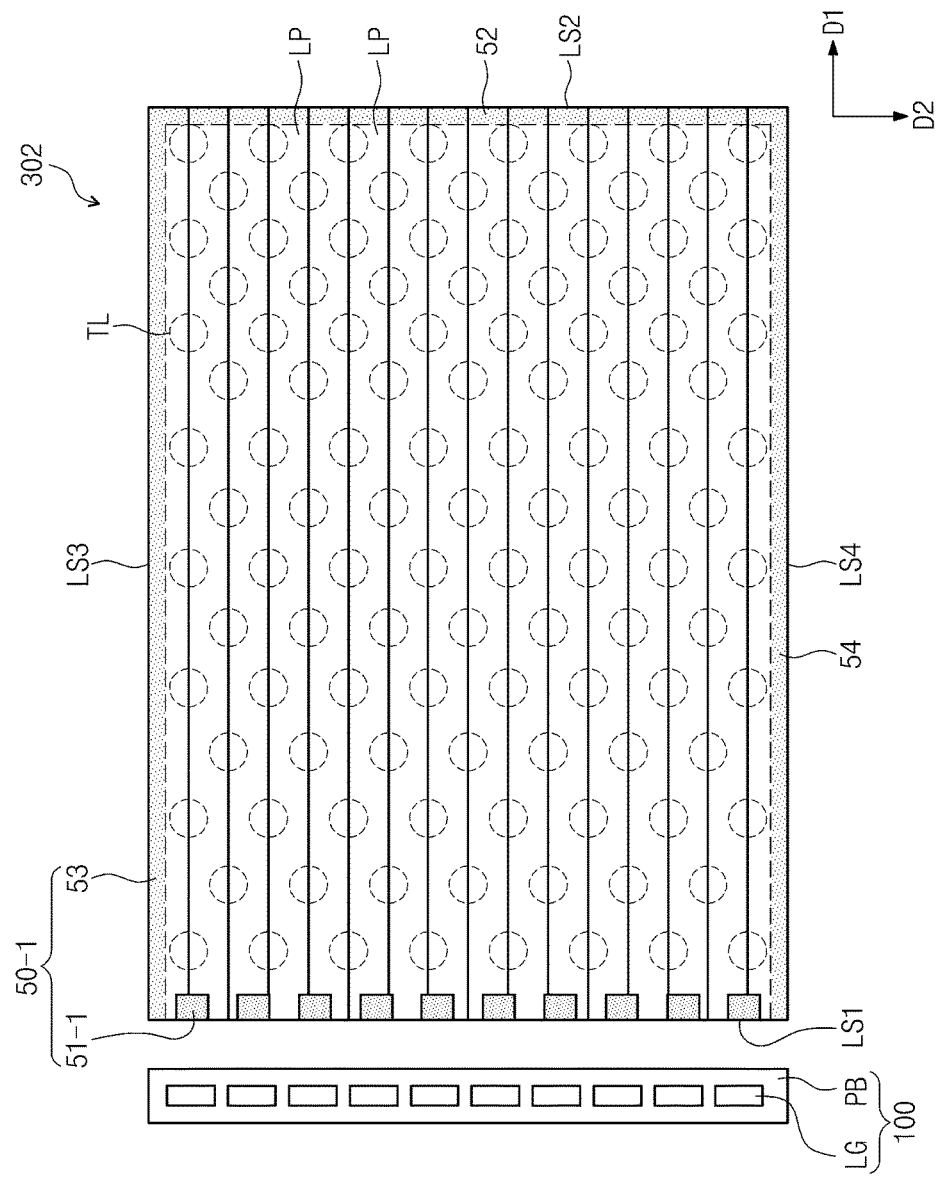
FIG. 6 is a plan view illustrating another exemplary embodiment of an optical component and a light-emitting unit according to the invention.

FIG. 6 is a plan view illustrating an optical component 302 and a light-emitting unit 100 according to another exemplary embodiment of the invention. Since in an optical component 302, except for a reinforcing part 50-1, the optical component 302 includes the same components as the aforementioned optical component 300 (refer to FIG. 1B), overlapping description of the components will not be provided in describing FIG. 6.

Referring to FIG. 6, the optical component 302 includes a light guiding film LGF (not shown), light-collecting layers LP, an optical sheet ST (not shown), and a reinforcing part 50-1.

In the illustrated exemplary embodiment, the reinforcing part 50-1 includes a first reinforcing pattern 51-1, a second reinforcing pattern 52, a third reinforcing pattern 53, and a fourth reinforcing pattern 54. Each of the second to fourth reinforcing patterns 52, 53, and 54 may have a continuous linear shape, and the first reinforcing pattern 51-1 may have a shape in which a plurality of dots are arranged in a second direction D2.

In the illustrated exemplary embodiment, each of the plurality of dots defining the first reinforcing pattern 51-1 may be a polygon, and in another exemplary embodiment, each of the plurality of dots may have a circular or elliptical shape.

Like the aforementioned embodiments, in the illustrated exemplary embodiment, the reinforcing part 50-1 supports the light guiding film of the optical component 302 and the optical sheet therebetween. Accordingly, the light guiding film and the optical sheet may be prevented from being separated from each other in the optical component 302.

Figure 7:
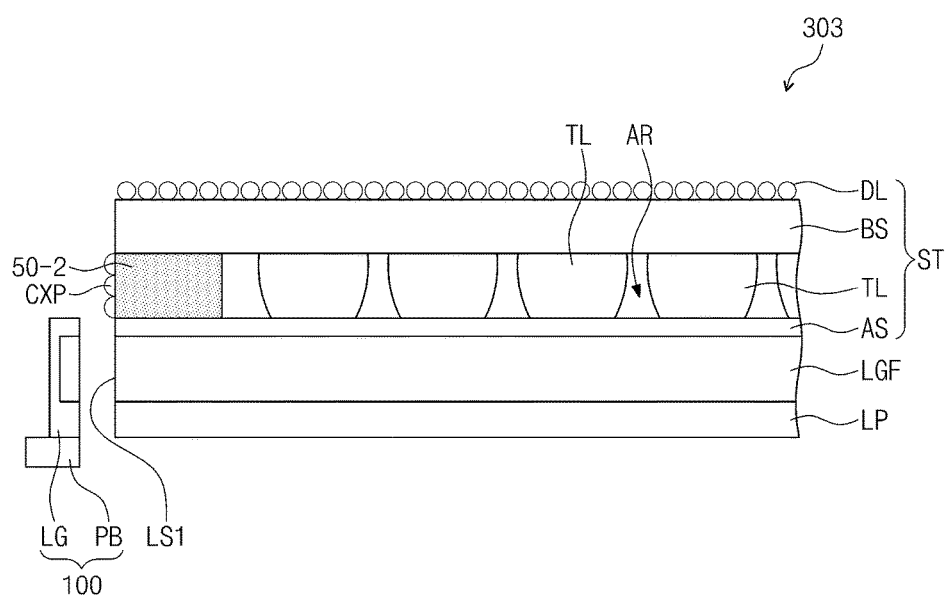
FIG. 7 is a cross-sectional view of another exemplary embodiment of an optical member according to the invention.

FIG. 7 is a cross-sectional view of an optical component 303 according to another exemplary embodiment of the invention. In describing FIG. 7, previously described components will be designated by the same reference numerals, and overlapping descriptions thereof will not be provided.

Referring to FIG. 7, an optical component 303 includes a light guiding film LGF, light-collecting layers LP, an optical sheet TL, and a reinforcing part 50-2.

In the illustrated exemplary embodiment, an outer surface of the reinforcing part 50-2 has a concavo-convex pattern CXP. Accordingly, before the light generated from a light source LG or provided from the outside of the optical component 303 is introduced into the optical component 303 through the reinforcing part 50-2, the light may be diffused by the concavo-convex pattern CXP. As a result, although the light is introduced into the optical component 303, the brightness of the light outputted by the optical component 303 may be prevented from being uneven by the introduced light.

According to an exemplary embodiment of the invention, in an optical component in which a light guiding film and an optical sheet are integrated, a reinforcing part is filled between the light guiding film and the optical sheet, so that a space between the optical component and the optical sheet may be supported by the reinforcing part. Thus, the light guiding film may be prevented from being separated from the optical component.

Also, according to another exemplary embodiment of the invention, a light-blocking layer is disposed on an outer surface of a reinforcing part, and thus the light introduced into an optical component through the reinforcing part may be blocked by the light-blocking layer. Thus, the brightness of the light outputted from the optical component may be prevented from being uneven by the introduced light, and the amount of light outputted in a direction inclined with respect to the front surface direction of the optical component is decreased, so that a light-collecting effect of the optical component may be improved.

It will be apparent to those skilled in the art that various modifications and variations can be made in the invention. Thus, it is intended that the invention covers the modifications and variations of this invention provided they come within the scope of the appended claims and their equivalents. Therefore, the scope of the invention is defined not by the detailed description of the invention but by the appended claims.

Figure 8:
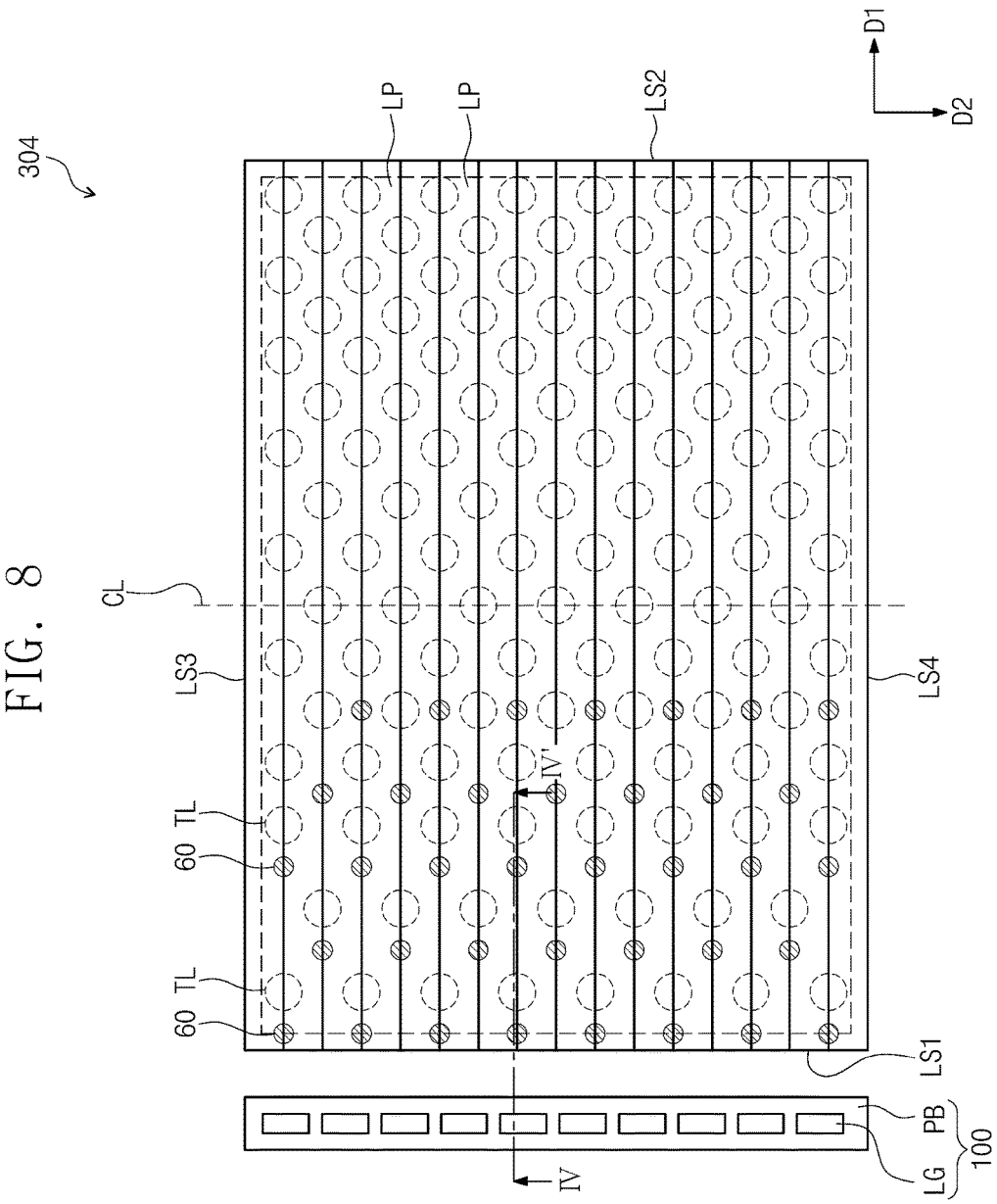
FIG. 8 is a plan view illustrating another exemplary embodiment of a display device according to the invention.
Figure 9:
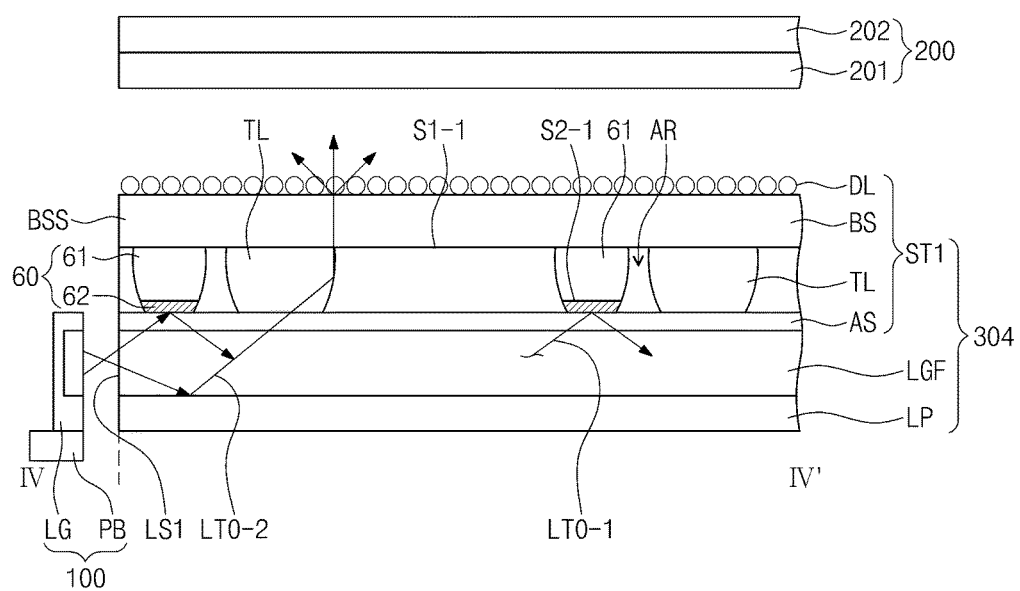
FIG. 9 is a cross-sectional view illustrating a portion taken along line IV-IV' of FIG. 8.

FIG. 8 is a plan view illustrating a display device according to another exemplary embodiment of the invention, and FIG. 9 is a cross-sectional view illustrating a portion taken along line IV-IV' of FIG. 8. In describing FIGS. 8 and 9, previously described components will be designated by the same reference numerals, and overlapping descriptions thereof will not be provided.

Referring to FIGS. 8 and 9, a display device includes a display panel 200, a light-emitting unit 100 and an optical component 304.

In the illustrated exemplary embodiment, the optical component 304 includes a light guiding film LGF, light-collecting layers LP, an optical sheet ST1, and the light guiding film LGF and the optical sheet ST1 are coupled to each other to have a shape connected to each other.

In the illustrated exemplary embodiment, the optical sheet ST1 includes a base film BS, an adhesive layer AS, optical patterns TL and reinforcing patterns 60.

As described with reference to FIG. 2 and FIG. 3A, the optical patterns TL includes polymer material which have a light-transmitting property, and the optical patterns TL are disposed between the base film BS and the light guiding film LGF to be coupled to the base film BS and the light guiding film LGF. Accordingly, a light LT0, which is provided from the light-emitting unit 100 and totally reflected inside the light guiding film LGF, is incident to the optical patterns TL, and the light LT0 incident to the optical patterns TL is refracted by the optical patterns TL and is collected in a direction toward the front surface of the display panel 200.

In the illustrated exemplary embodiment, amount of the light LT0 emitted from the light guiding film LGF through the optical patterns TL may be increased as the density of the optical patterns TL is increased in the light guiding film LGF. Accordingly, the closer the optical patterns TL to the incident surface LS1, the smaller the density of the optical patterns TL may become, and the closer the optical patterns TL to the opposing surface LS2, the greater the density of the optical patterns TL may become.

In the illustrated exemplary embodiment, the reinforcing patterns 60 are disposed between the base film BS and the light guiding film LGF to be coupled to the base film BS and the light guiding film LGF.

In the illustrated exemplary embodiment, the reinforcing patterns 60 are spaced apart from the optical patterns TL, and each of the reinforcing patterns 60 has a shape of a dot in a plan view. In another exemplary embodiment, the each of the reinforcing patterns 60 has a shape of an ellipse or a polygon in a plan view.

In the illustrated exemplary embodiment, the each of the reinforcing patterns 60 includes a base layer 61 and a reflective layer 62. The base layer 61 includes polymer material having a light-transmitting property and a shape of the base layer 61 may be similar to a shape of each of the optical patterns TL. In more detail, the base layer 61 has a tapered shape, i.e., the closer the base layer 61 to an upper surface S1-1, the greater a width of the base layer 61 may become, and the closer the base layer 61 to the lower surface S2-1, the smaller the width of the base layer 61 may become.

The reflective layer 62 is disposed on the lower surface S2-1 of the base layer 61 to be interposed between the base layer 61 and the light guiding film LGF. Additionally, the reflective layer 62 is attached to the light guiding film LGF by the adhesive layer AS.

In the illustrated exemplary embodiment, the reflective layer 62 includes metallic material such as silver and aluminum. In another exemplary embodiment, the reflective layer 62 includes metallic oxide such as titanium oxide or polymer material including white pigments.

The reflective layer 62 may reflects a light travelling toward the reinforcing patterns 60. In more detail, when a first light LT0-1 which travels toward the reinforcing patterns 60 through the incident surface LS1 is defined, the first light LT0-1 may be not incident to the reinforcing patterns 60 by the reflective layer 62, and the first light LT0-1 is reflected by the reflective layer 62 to be totally reflected inside the light guiding film LGF again.

In the illustrated exemplary embodiment, an ink including silver is provided to a surface of a transfer roller, for example, and the transfer roller rolls the lower surface S2-1 of the base layer 61. As a result, the ink is transferred from the transfer roller to the base layer 61 to form the reflective layer 62.

When a second light LT0-2 which travels toward to the optical patterns TL through the incident surface LS1 is defined, as described with reference to FIG. 4, the second light LT0-2 is incident to the optical patterns TL, and the second light LT0-2 may be emitted from the optical component 304.

Referring to routes of the first light LT0-1 and the second light LT0-2, the optical patterns TL emits the light totally reflected inside the light guiding film LGF to the out outside of the light guiding film LGF, however the reinforcing patterns 60 may not emit the light totally reflected inside the light guiding film LGF to the outside of the light guiding film LGF.

The reinforcing patterns 60 and the optical patterns TL are disposed between the base film BS and the light guiding film LGF to be coupled to the base film BS and the light guiding film LGF, and as a result, a coupling force between the optical sheet ST1 and the light guiding film LGF is improved by the optical patterns TL and the reinforcing patterns 60.

As describe the above, the closer the optical patterns TL to the incident surface LS1, the smaller the density of the optical patterns TL may become, and the closer the optical patterns TL to the opposing surface LS2, the greater the density of the optical patterns TL may become. As a result, a coupling force, which corresponds to the incident surface LS1 and is generated by the optical patterns TL, between the optical sheet ST1 and the light guiding film LGF may be weaker than a coupling force, which corresponds to the opposing surface LS2 and are generated by the optical patterns TL, between the optical sheet ST1 and the light guiding film LGF. However, in the illustrated exemplary embodiment, the coupling force between the optical sheet ST1 and the light guiding film LGF is complemented by the reinforcing patterns 60 as well as the optical patterns TL, especially, the coupling force, which corresponds to the incident surface LS1, between the optical sheet ST1 and the light guiding film LGF is complemented by the reinforcing patterns 60.

An imaginary line CL is defined substantially parallel to the incident surface LS1 and the opposing surface LS2 to divide the optical component 304 into two portions in a plan view, in the illustrated exemplary embodiment the reinforcing patterns 60 are disposed between the incident surface LS1 and the imaginary line CL in a plan view.

Figure 10:
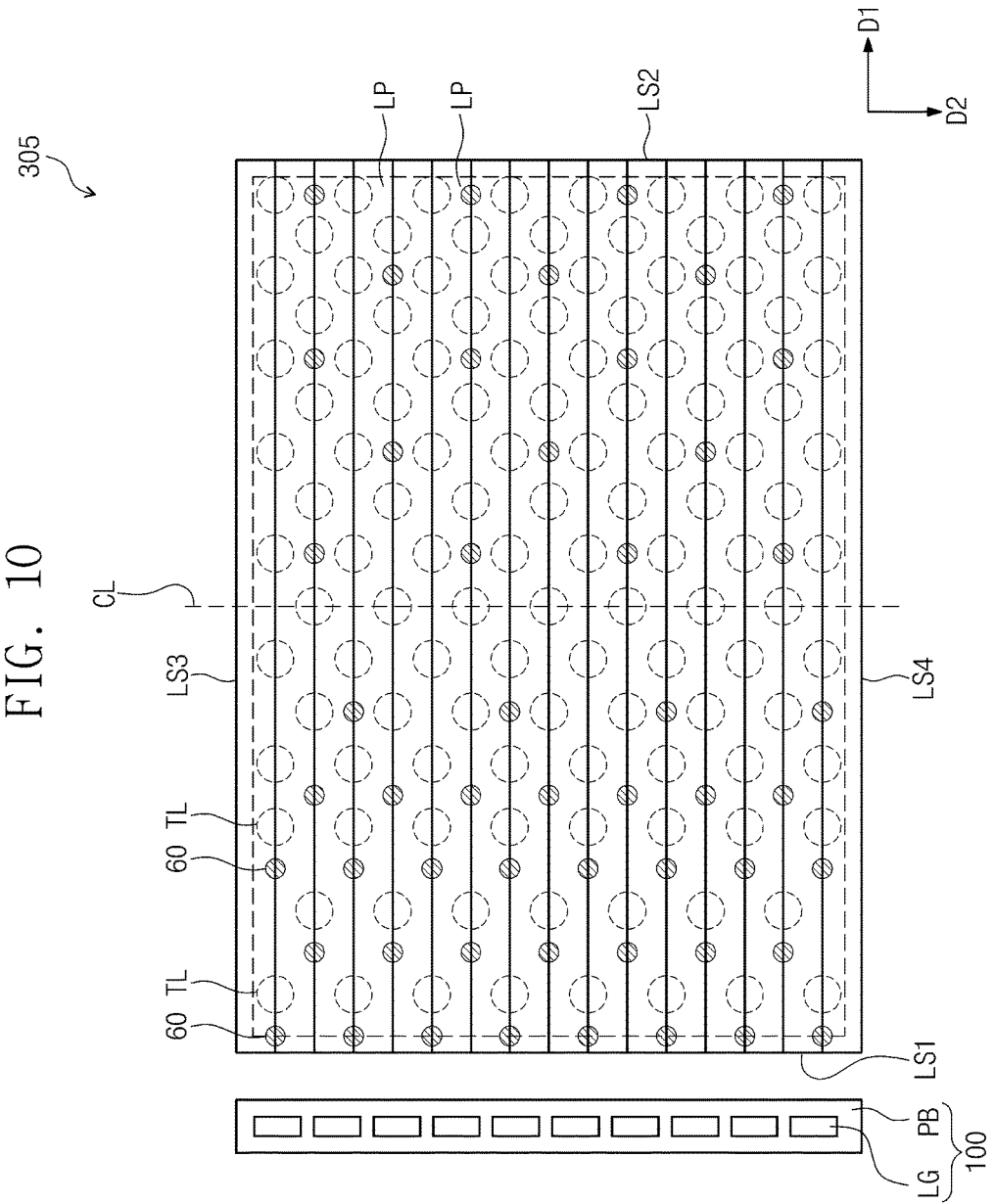
FIG. 10 is a plan view illustrating another exemplary embodiment of a light-emitting unit and an optical component of a display device according to the inventive step.

FIG. 10 is a plan view illustrating a light-emitting unit 100 and an optical component 305 of a display device according to another exemplary embodiment of the inventive step. In describing FIG. 10, previously described components will be designated by the same reference numerals, and overlapping descriptions thereof will not be provided.

Referring to an optical component 304 in FIG. 8, reinforcing patterns 60 in FIG. 8 are disposed between an incident surface LS1 in FIG. 8 and an imaginary line CL in FIG. 8. On the contrary, referring to FIG. 10, reinforcing patterns 60 are disposed from an incident surface LS1 to an opposing surface LS2, and a density of the reinforcing patterns 60 increases as a distance from the opposing surface LS2 to the incident surface LS1 increases.

As description with reference to FIG. 8, a density of the optical patterns TL increases as a distance from the incident surface LS1 to the opposing surface LS2 increases As a result, a coupling force, which corresponds to the incident surface LS1 and is generated by the optical patterns TL, between the optical sheet ST1 and the light guiding film LGF, may be weaker than a coupling force, which corresponds to the opposing surface LS2 and are generated by the optical patterns TL, between the optical sheet ST1 and the light guiding film LGF. However, in the illustrated exemplary embodiment, a density of the reinforcing patterns 60 increases as a distance from the opposing surface LS2 to the incident surface LS1 increases. As a result, a coupling force, which corresponds to the incident surface LS1 and is generated by the reinforcing patterns 60, between the optical sheet ST1 and the light guiding film LGF, is greater than a coupling force, which corresponds to the opposing surface LS2 and is generated by the reinforcing patterns 60, between the optical sheet ST1 and the light guiding film LGF. Accordingly, the coupling force, which corresponds to the incident surface LS1, between the optical sheet ST1 and the light guiding film LGF is complemented by the reinforcing patterns 60, and as a result, a portion of the light guiding film LGF may be prevented from being separated from the optical sheet ST1.

Figure 11:
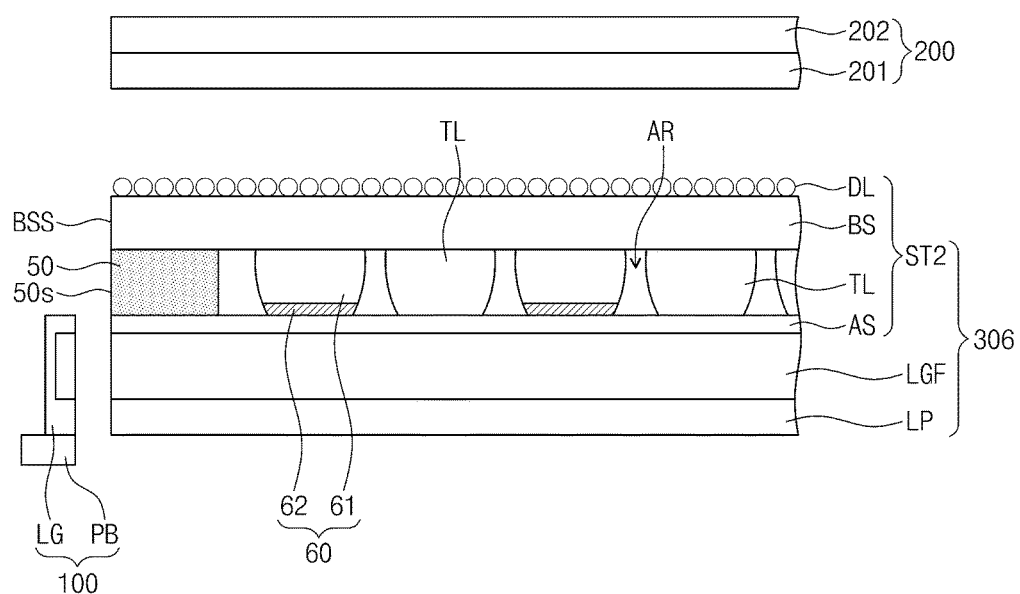
FIG. 11 is a cross-sectional view of another exemplary embodiment of a display device according to the invention.

FIG. 11 is a cross-sectional view of a display device according to another exemplary embodiment of the invention. In describing FIG. 11, previously described components will be designated by the same reference numerals, and overlapping descriptions thereof will not be provided.

Referring to FIG. 11, a display device includes a display panel 200, an optical component 306 and a light-emitting unit 100, and the optical component 306 includes a light guiding film LGF, light-collecting layers LP and an optical sheet ST1. Additionally, the optical sheet ST2 includes a base film BS, an adhesive layer AS, optical patterns TL, reinforcing patterns 60 and a reinforcing part 50.

In the illustrated exemplary embodiment, the reinforcing part 50 described with reference to FIGS. 1A and 1B and the reinforcing patterns 60 described with reference to FIGS. 8 and 9 are disposed between the base film BS and the light guiding film LGF. As a result, a coupling force the optical sheet ST2 and the light guiding film LGF is improved by the reinforcing part 50 and the reinforcing patterns 60, and a portion of the light guiding film LGF corresponding to the incident surface LS1 may be prevented from being separated from the optical sheet ST2.

What is claimed is:
1. A display device comprising:
a display panel;
a light source which generates light; and
an optical component which receives the light and outputs the received light toward the display panel, and includes:
a light guiding film which guides the light toward the display panel;

an optical sheet which is coupled to the light guiding film, and the optical sheet includes:
a base film;
optical patterns which are disposed between the base film and the light guiding film and adjust a traveling direction of the light; and
an adhesive layer disposed between the optical sheet and the light guiding film, and a lower surface of each of the optical patterns is attached to the adhesive layer, and an upper surface of the light guiding film is attached to the adhesive layer; and
a reinforcing part disposed between the base film and the adhesive layer corresponding to a periphery of the optical component,
wherein an outer surface of the light guiding film, an outer surface of the base film, and an outer surface of the reinforcing part are positioned on one imaginary surface at one side of the optical component, and
the outer surface of the reinforcing part has a concavo-convex pattern.

2. The display device of claim 1, wherein the optical component further comprises a light-blocking layer disposed on the outer surface of the reinforcing part.

3. The display device of claim 1, wherein each of the optical patterns has a dot shape in a plan view.

4. The display device of claim 1, wherein the reinforcing part has a linear shape in a plan view.

5. The display device of claim 1, wherein a portion of the reinforcing part has a linear shape in a plan view, and another portion of the reinforcing part has a shape in which a plurality of dots is arranged in the plan view.

6. A display device comprising:
a display panel;
a light source which generates light; and
an optical component which receives the light and outputs the received light toward the display panel, and includes:
a light guiding film which guides the light toward the display panel;
an optical sheet which is coupled to the light guiding film, and the optical sheet includes a base film and optical patterns which are disposed between the base film and the light guiding film and adjust a traveling direction of the light; and
a reinforcing part disposed between the base film and the light guiding film corresponding to a periphery of the optical component, wherein an incident surface facing the light source is defined on the light guiding film, and the reinforcing part extends along the incident surface.

7. The display device of claim 6, wherein
an opposing surface facing the incident surface and a connecting surface connecting the incident surface to the opposing surface are defined on the light guiding film, and
the reinforcing part extends along at least one between the opposing surface and the connecting surface.

8. The display device of claim 7, wherein the optical component further comprises light-collecting layers which have a shape protruding from a rear surface of the light guiding film and have a length direction in a direction from the incident surface toward the opposing surface in a plan view.

9. The display device of claim 7, wherein a length direction of each of the optical patterns is parallel to a length direction of the incident surface in a plan view, and a width direction of each of the optical patterns is parallel to a length direction of the connecting surface in a plan view.

10. The display device of claim 1, wherein the optical sheet further comprises a diffusing layer which is disposed on the base film and faces the optical patterns with the base film disposed therebetween.

11. The display device of claim 1, wherein the optical patterns are disposed spaced apart from each other between the light guiding film and the base film, and an air layer is defined between adjacent optical patterns among the optical patterns.

12. The display device of claim 1, wherein the closer each of the optical patterns from the light guiding film to the base film, the greater the width of each of the optical patterns.

13. The display device of claim 1, wherein the optical sheet further comprises:
a plurality of reinforcing patterns disposed between the base film and the light guiding film,
wherein each of the plurality of reinforcing patterns comprises:
a base layer having a light-transmitting property and coupled to the light guiding film and the base film; and
a reflective layer disposed between the base layer and the light guiding film.

14. A display device comprising:
a display panel;
a light source generating light; and
an optical component which receives the light and outputs the received light toward the display panel,
wherein the optical component comprises:
a light guiding film; and
an optical sheet which is coupled to the light guiding film, and
wherein the optical sheet comprises:
a base film;
a plurality of optical patterns disposed between the base film and the light guiding film; and
a plurality of reinforcing patterns disposed between the base film and the light guiding film, each of the plurality of reinforcing patterns including a reflective layer attached to an upper surface of the light guiding film facing the display panel,
wherein the each of the plurality of reinforcing patterns further comprises:
a base layer having a light-transmitting property and disposed between the light guiding film and the base film; and
wherein the reflective layer of the each of the plurality of reinforcing patterns is disposed between the base layer and the light guiding film.

15. The display device of claim 14, wherein an incident surface and an opposing surface opposing the incident surface are defined in the light guiding film, an imaginary line is defined substantially parallel to the incident surface and the opposing surface to divide the optical component into two portions in a plan view, and a number of reinforcing patterns of the plurality of reinforcing patterns disposed between the incident surface and the imaginary line in the plan view is greater than a number of reinforcing patterns of the plurality of reinforcing patterns disposed between the opposing surface and the imaginary line in the plan view.

16. The display device of claim 14, wherein an incident surface and an opposing surface opposing the incident surface are defined in the light guiding film, and a density of the plurality of optical patterns increases as a distance from the incident surface to the opposing surface.

17. The display device of claim 14, wherein the optical sheet further comprises;
   an adhesive layer which is attached to the light guiding film,
   wherein a lower surface of each of the plurality of optical patterns is attached to the adhesive layer, and the reflective layer is attached to the adhesive layer.

* * * * *